United States Patent [19]

Denk et al.

[11] 4,178,274

[45] Dec. 11, 1979

[54] CASTING RESIN COMPOSITIONS FOR SEALING OPTO-ELECTRONIC COMPONENTS

[75] Inventors: Hans Denk, Gauting; Ulrike Reeh, Münich, both of Fed. Rep. of Germany

[73] Assignee: Siemens Aktiengesellschaft, Munich, Fed. Rep. of Germany

[21] Appl. No.: 886,432

[22] Filed: Mar. 14, 1978

[30] Foreign Application Priority Data

Sep. 21, 1976 [DE] Fed. Rep. of Germany ........ 2642465

[51] Int. Cl.$^2$ ........................... C08K 5/09; C08K 5/10
[52] U.S. Cl. ........................... 260/31.8 E; 260/31.8 C; 260/31.8 J; 260/33.4 EP; 260/45.7 P; 427/58; 528/297; 528/361; 528/365
[58] Field of Search .................... 260/835, 78.3, 78.41, 260/2 EP, 33.4 EP, 31.8 E, 31.8 C, 31.8 J, 45.7 P; 313/499, 500; 357/17, 74; 29/563; 427/58; 528/297, 361, 365

[56] References Cited

U.S. PATENT DOCUMENTS

| | | | |
|---|---|---|---|
| 3,018,262 | 1/1962 | Schroeder | 260/78.41 |
| 3,128,255 | 4/1964 | McGary, Jr. et al. | 260/78.41 |
| 3,544,827 | 12/1970 | Witterick et al. | 313/499 |
| 3,555,111 | 1/1971 | Benham | 260/835 |
| 3,849,383 | 11/1974 | Fetscher et al. | 260/835 |

*Primary Examiner*—J. Ziegler
*Attorney, Agent, or Firm*—Kenyon & Kenyon

[57] ABSTRACT

Casting resin compositions for sealing opto-electronic components on the basis of quick-setting casting resin compounds, consisting of at least one epoxy compound with a cycloaliphatic base with at least two oxiran rings in the molecule, at least one carbonic acid anhydride, a zinc octoate, a low-molecular polyol and/or a low-molecular acid ester and, optionally, an organic phosphorus compound and customary brighteners and light-scattering material in powder form and pigments. Especially suitable is a zinc octoate with a zinc content of 21 to 22% by weight. The compounds are used for covering and coating light-emitting diodes, photo transistors, photo diodes and light-emitting diode displays and as light guides for opto-electronic couplers.

15 Claims, No Drawings

CASTING RESIN COMPOSITIONS FOR SEALING OPTO-ELECTRONIC COMPONENTS

BACKGROUND OF THE INVENTION

The invention relates to transparent casting resin compositions for sealing opto-electronic components on the basis of acid anhydride-hardenable epoxy compounds with at least two oxiran rings in the molecule, together with organo-metallic compounds, low-molecular polyols and/or low-molecular acid esters and, optionally, with organic phosphorus compounds, optical brighteners, pigments and light-scattering materials in powder form.

It is known to use, for covering or coating opto-electronic components, light-permeable, acid anhydride-hardenable epoxy casting resin compounds of the bisphenol-A type (German Offenlegungsschrift No. 589 264 = U.S. Pat. No. 3,544,827).

One disadvantage of epoxy casting resin compounds based on bisphenol-A/acid anhydride, which harden fast through the use of known accelerators such as tertiary amines, imidazoles or borofluoride complexes, is their poor thermal aging stability. The materials used heretofore become discolored in extended storage at temperatures above 80° C., through yellow to brown, whereby their light transmittancy decreases considerably.

SUMMARY OF THE INVENTION

It is accordingly an object of the invention to prepare transparent or transparently colored, optionally light-scattering casting resin coverings or casting resin coatings for opto-electronic components, which do not become discolored up to at least 120° C. when heat-aged for more than 2,000 hours, are system-compatible and adhere well.

In addition, it should be possible to take the components covered or coated with the casting resin compounds according to the invention out of the mold at a hardening temperature of 150° C. in less than 5 minutes. The molded material generated on and around the opto-electronic components should protect the functional parts of the components against mechanical damage, moisture, corrosive gases and other environment effects. Further, the molded material should be resistant to electroplating baths such as tin-plating baths.

According to the invention, the above objects are achieved with a casting resin composition comprising:
(a) at least one epoxy compound of the cycloaliphatic type;
(b) at least one carbonic acid anhydride;
(c) a zinc octoate;
(d) a low-molecular polyol and/or low-molecular acid ester; and,
(e) optionally, an organic phosphorus compound.

The casting resin composition according to the invention sets in a few minutes as a molded material without voids, without striations and with an optically perfect surface.

The casting resin compositions according to the invention, whether colorless or transparently colored, can be prepared from preliminary mixtures which are unaffected by storage, namely, the preliminary mixture (A) consisting of a cycloaliphatic epoxy resin, a low-molecular polyol, optionally together with an optical brightener; the preliminary mixture (B) consisting of a carbonic acid anhydride and a low-molecular acid ester; and the preliminary mixture (C) consisting of zinc octoate, an organic phosphorus compound and a low-molecular acid ester, optionally together with pigments. To produce light-scattering casting resin coatings according to the invention, a further storage-stable preliminary mixture (D) consisting of a cycloaliphatic epoxy resin and a light-scattering material in powder form is admixed to the casting resin composition. This division into storage-stable, flowable preliminary mixtures allows the casting resin compositions to be prepared and processed in a mechanized or automated manner.

The molded cast-resin material produced for covering or coating may have different shapes. For example, it may be lens-shaped, cylindrical, planar or prismatic.

Epoxies suitable for preparing the casting resin compositions according to the invention are, for example, 3,4-epoxycyclohexylmethyl-(3,4-epoxy) cyclohexane carboxylate, 2-(3,4-epoxy) cyclohexyl-5,5-spiro(3,4-epoxy) cyclohexane-m-dioxane and mixtures of those compounds.

Suitable carbonic acid anhydrides are, for example, tetrahydrophthalic acid anhydride, methylhexahydrophthalic acid anhydride or succinic acid anhydride. Hexahydrophthalic acid anhydride has been found to be particularly well suited. Mixtures of the cited acid anhydrides can also be employed.

As a reaction accelerator, a zinc octoate consisting of zinc and a 2-ethylhexane acid residue in a mol ratio of 1:2, corresponding to a zinc content of approximately 18% by weight, is suitable. A zinc octoate with a zinc content in the range of from about 21 to 22% by weight has been found to be particularly advantageous. With the same weight content of accelerator, the mold release time at a hardening temperature of 150° C. can be reduced to less than 3 minutes even with a very small amount of casting resin composition (less than 0.1 g). Zinc octoate is preferably utilized together with an organic phosphorus compound in solution. As a solvent, compounds are suitable which, on the one hand, completely solve zinc octoate and any phosphite used and, on the other hand, form a chemical compound with the resin or hardener component during the hardening by at least one reactive group via an addition reaction, in order to prevent later migration of the solvent in the molded casting resin material.

Suitable solvents are, for example, low-molecular polyols and low-molecular acid carbonic-acid esters and their mixtures. As particularly well suited have been found trimethylol propane or 3-methylpentanediol-1,5 and hexahydrophthalic acid monoethyl ester.

Suitable organic phosphorus compounds are, for example, diphenyldecylphosphite, triphenylphosphite and didecylphenylphosphite. Diphenyldecylphosphite has been found to be especially suitable. These compounds act as antioxidation agents and as reaction accelerators and lower the initial viscosity of the casting resin composition.

As an optical brightener, the commercially available Waxoline Violet ® is suited.

Suitable light-scattering materials in powder form are silicic acids produced by flame hydrolysis from silicon tetrachloride in an oxygen-hydrogen flame, commercially available as Aerosil ®, as well as synthetically prepared, micronized porous silicic acid, commercially available as Syloid ®, and barium sulfate, boron nitride, calcium carbonate and calcium fluoride.

For coloring the casting resin compounds according to the invention, commerically available Orasol dyes ® (for example, Orasol scarlet GLN, Orasol yellow 3 GLG), Waxoline dyes ® (for example, Waxoline red O), Mikrolite dyes ® (for example, Mikrolith green GT) and pigment colors (chromium oxide, color paste DW 04) can be used.

The casting resin compositions according to the invention are liquid at room temperature. At room temperature, they have a long use span. They can be dosed easily, which greatly facilitates processing them by means of multiple dosing devices. A great advantage is the fast release from the mold of the molded materials made from the casting resin composition according to the invention, which reduces the mold use time considerably.

The casting resin compounds can be used for covering or coating opto-electronic components such as light-emitting diodes, photo diodes, photo transistors and for sealing light-emitting diode displays and as light guide resins for opto-electronic couplers.

DETAILED DESCRIPTION OF THE INVENTION

The invention will be explained in further detail by the following examples.

EXAMPLE 1

Transparent casting resin composition
Preparation of the preliminary mixture A:

94 parts by weight 3,4-epoxycyclohexylmethyl-(3,4-epoxy) cyclohexane carboxylate are mixed homogeneously at room temperature with 0.00014 parts by weight Waxoline Violet A and 6 parts by weight 3-methylpentanediol-1,5.

Preparation of preliminary mixture B:

88 parts by weight hexahydrophthalic acid anhydride are mixed homogeneously at 60° to 70° C. with 12 parts by weight hexahydrophthalic acid monoethylester.

Preparation of preliminary mixture C:

7 parts by weight diphenyldecyl phosphite and 6 parts by weight zinc octoate are mixed at room temperature with 13 parts by weight of the hexahydrophthalic acid monoethyl ester melted at 40° to 50° C.

Preparation of the casting resin composition from the preliminary mixtures A, B and C:

100 parts by weight of preliminary mixture A are mixed homogeneously at room temperature with 100 parts by weight of the preliminary mixture B and 18 parts by weight of the preliminary mixture C.

EXAMPLE 2

Transparent Casting Resin Composition (without phosphite)

Preparation of preliminary mixture A:

94 parts by weight 3,4-epoxycyclohexylmethyl-(3,4-epoxy) cyclohexane carboxylate are homogeneously mixed at room temperature with 0.00015 parts by weight Waxoline Violet A and 6 parts by weight 3-methylpentanediol-1,5.

Preparation of preliminary mixture B:

88 parts by weight hexahydrophthalic acid anhydride are mixed homogeneously with 12 parts by weight hexahydrophthalic acid monoethyl ester.

Preparation of the casting resin composition of the preliminary mixtures A, B and zinc octoate:

6 parts by weight zinc octoate are stirred at room temperature into 100 parts by weight of preliminary mixture B and then 100 parts by weight of the preliminary mixture A are admixed.

EXAMPLE 3

Red-Colored, Light-Scattering Casting Resin Composition

Preparation of the preliminary mixture A:

94 parts by weight 3,4-epoxycyclohexylmethyl-(3,4-epoxy) cyclohexane carboxylate are mixed homogeneously at room temperature with 0.00015 parts by weight Waxoline Violet A and 6 parts by weight 3-methylpentanediol-1,5.

Preparation of the preliminary mixture B:

88 parts by weight hexahydrophthalic acid anhydride are mixed with 12 parts by weight hexahydrophthalic acid monoethyl ester at 60° to 70° C.

Preparation of preliminary mixture C:

7 parts by weight diphenyldecyl phosphite and 6 parts by weight zinc octoate are mixed at room temperature with 13 parts by weight of the hexahydrophthalic acid ethyl ester melted at 40° to 50° C. To 18 parts by weight of this mixture are admixed 0.04 parts by weight Waxoline red O.

Preparation of preliminary mixture D:

1.3 parts by weight calcium fluoride are made into a paste with 0.5 parts by weight 3,4-epoxicyclohexylmethyl-(3,4-epoxicyclohexylmethyl-(3,4-epoxi)cyclohexane carboxylate.

Preparation of the casting resin composition from the preliminary mixtures A, B, C and D:

100 parts by weight of the preliminary mixture A are homogeneously mixed at room temperature with 100 parts by weight of the preliminary mixture B, 18 parts by weight of the preliminary mixture C and 1.8 parts by weight of the preliminary mixture D.

EXAMPLE 4

Transparent Casting Resin Composition

Preparation of preliminary mixture A:

100 parts by weight of a mixture of 50 parts by weight 3,4- epoxycyclohexylmethyl-(3,4-epoxy)cyclohexane carboxylate and 50 parts by weight 2-(3,4-epoxy)cyclohexyl-5,5-spiro(3,4-epoxy) cyclohexane-m-dioxane are mixed at room temperature with 0.00015 parts by weight Waxoline Violet A.

Preparation of preliminary mixture B:

A mixture of 43 parts by weight hexahydrophthalic acid anhydride and 47 parts by weight methylhexahydrophthalic acid anhydride is homogeneously mixed with 12 parts by weight hexahydrophthalic acid monoethyl ester.

Preparation of preliminary mixture C:

7 parts by weight diphenyldecyl phosphite and 5 parts by weight zinc octoate are mixed at room temperature with 13 parts by weight of the hexahydrophthalic acid monoethyl ester melted at 40° to 50° C.

Preparation of the casting resin composition from the preliminary mixtures A, B and C:

100 parts by weight of the preliminary mixture A are mixed homogeneously at room temperature with 102 parts by weight of the preliminary mixture B and 18 parts by weight of the preliminary mixture C.

What is claimed is:

1. An acid anhydride-hardenable, epoxy-based casting resin composition which is liquid at room temperature comprising:

(a) at least one epoxy compound having a cycloaliphatic base and at least two oxiran rings;
(b) at least one carbonic acid anhydride;
(c) a zinc octoate; and
(d) a solvent selected from the group consisting of a low molecular weight polyol, a low molecular weight acid ester and mixtures thereof.

2. A casting resin composition according to claim 1 wherein said epoxy compound is 3,4-epoxycyclohexyl-methyl-(3,4-epoxy)cyclohexane carboxylate.

3. A casting resin composition according to claim 1 wherein said epoxy compound is 2-(3,4-epoxy) cyclohexyl-5,5-spiro (3,4-epoxy) cyclohexane-m-dioxane.

4. A casting resin composition according to claim 1 wherein said epoxy compound is a mixture of 3,4-epoxycyclohexylmethyl-(3,4-epoxy)cyclohexane carboxylate and 2-(3,4 epoxy)cyclohexyl-5,5-spiro (3,4-epoxy) cyclohexane-m-dioxane.

5. A casting resin composition according to claim 1 wherein said carbonic acid anhydride is hexahydrophthalic acid anhydride.

6. A casting composition according to any of claims 1, 2, 3, 4 or 5 wherein said zinc octoate has a zinc content of about 18% by weight.

7. A casting composition according to any of claims 1, 2, 3, 4 or 5 wherein said zinc octoate has a zinc content in the range of from about 21 to about 22% by weight.

8. A casting resin composition according to any of claims 1, 2, 3, 4 or 5 wherein said low-molecular weight polyol is selected from the group consisting of trimethylol propane, 3-methylpentanediol-1,5 and mixtures thereof.

9. A casting resin composition according to any of claims 1, 2, 3, 4 or 5 wherein said low-molecular weight acid ester is hexahydrophthalic acid monoethyl ester.

10. A casting resin composition according to any of claims 1, 2, 3, 4 or 5 further comprising an organic phosphorous compound.

11. A casting resin composition according to claim 10 wherein said phosphorous compound is diphenyldecylphosphite.

12. A method for protecting the functional parts of opto-electronic components comprising covering said components with a casting resin composition according to claim 1.

13. A method according to claim 12 wherein said opto-electronic component is selected from the group consisting of light-emitting diodes, photo transistors, photo diodes and lightemitting diode displays.

14. An acid anhydride-hardenable, transparent epoxy-based casting resin composition which is liquid at room temperature and hardenable in less than five minutes at 150° C. comprising:
(a) at least one epoxy compound having a cycloaliphatic base and at least two oxiran rings at the ring of said cycloaliphatic base;
(b) at least one carbonic acid anhydride;
(c) a zinc octoate; and
(d) a solvent selected from the group consisting of low molecular weight polyols, low molecular weight acid esters and mixtures thereof.

15. The casting resin composition of claim 14 wherein said epoxy compound is selected from the group consisting of 3,4-epoxycyclohexylmethyl-(3,4-epoxy) cyclohexane carboxylate; 2-(3,4-epoxy) cyclohexyl-5,5-spiro-(3,4-epoxy) cyclohexane—m—dioxane and mixtures thereof.

* * * * *